Nov. 12, 1968　　　J. R. LANGWORTHY　　　3,410,638
SPECTACLE FRAME WITH REAR VIEW TELESCOPES AND TEMPLE
MOUNTED OPTICAL FIBER RODS
Filed Dec. 9, 1965　　　　　　　　　　　　2 Sheets-Sheet 1
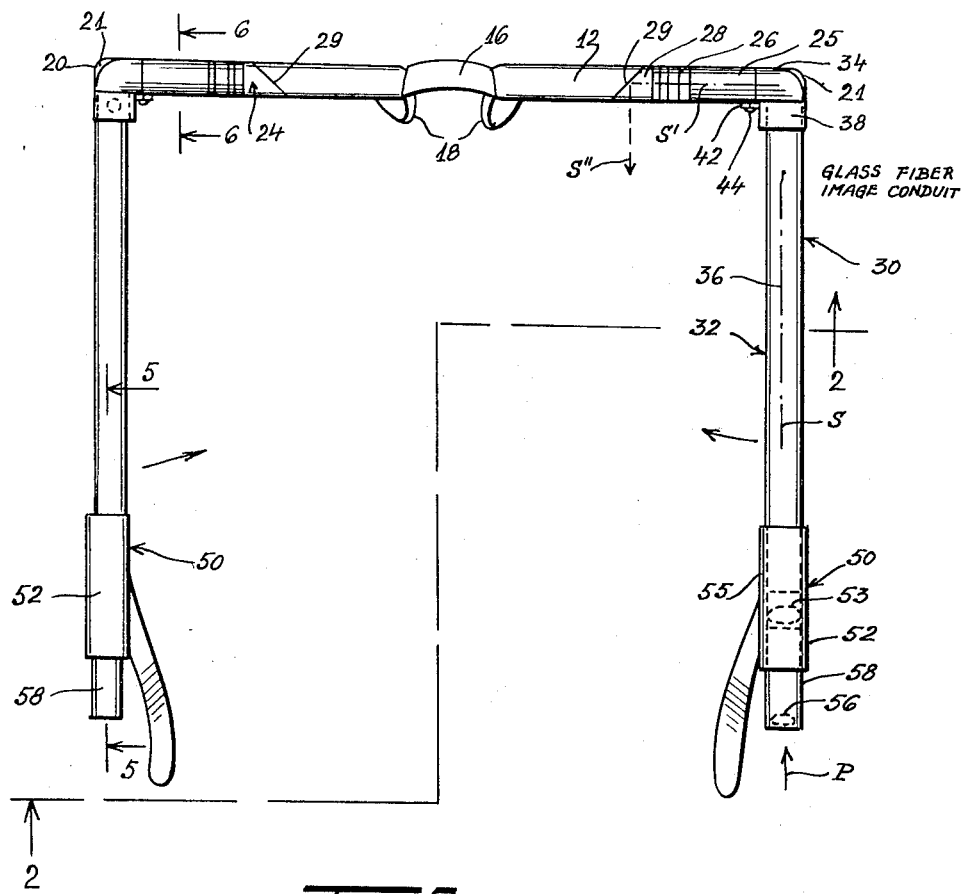
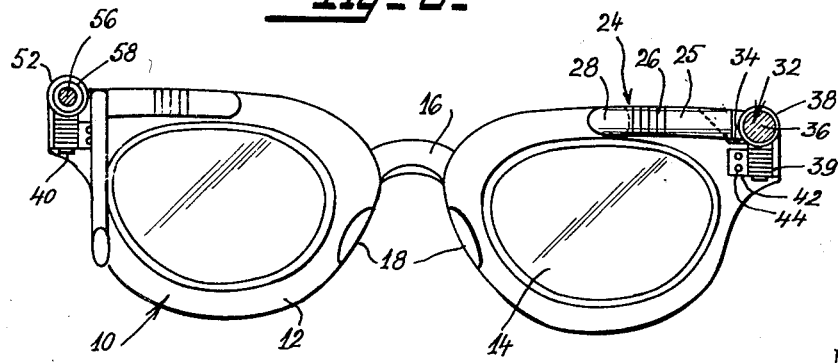
INVENTOR
*James Robert Langworthy*
BY
*Polachek & Saulsbury*
ATTORNEYS Nov. 12, 1968  J. R. LANGWORTHY  3,410,638
SPECTACLE FRAME WITH REAR VIEW TELESCOPES AND TEMPLE
MOUNTED OPTICAL FIBER RODS
Filed Dec. 9, 1965  2 Sheets-Sheet 2
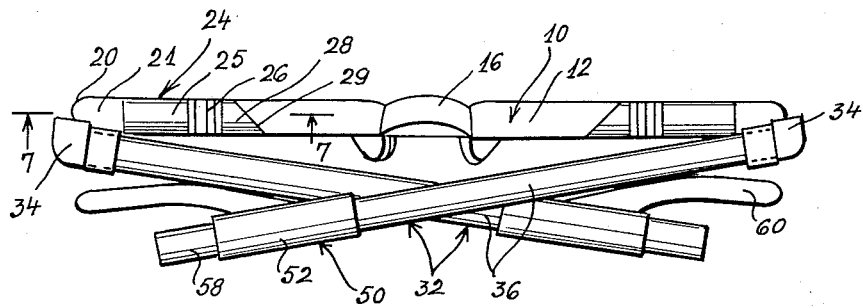
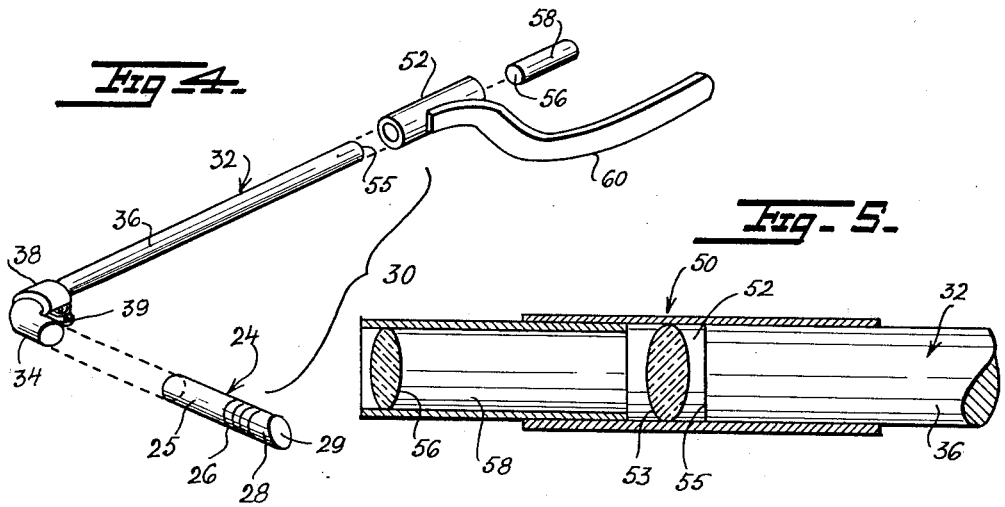
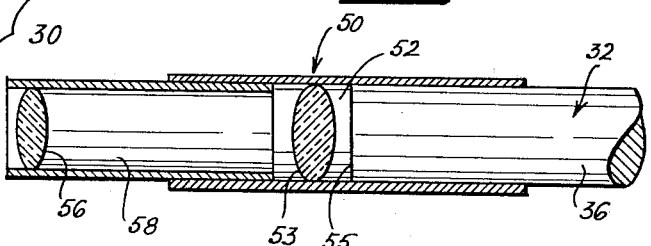
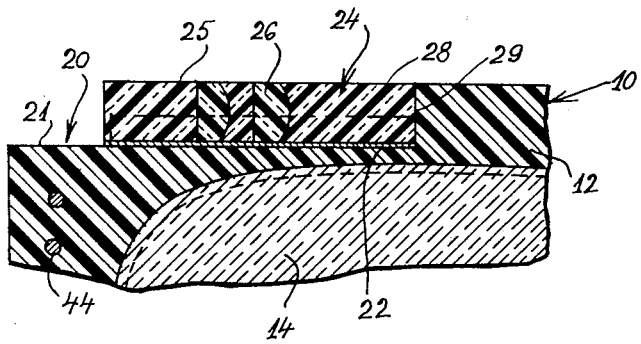
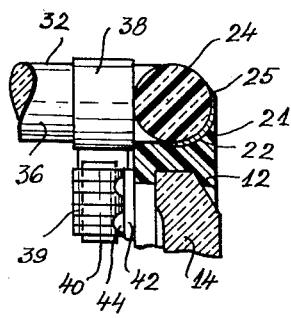
INVENTOR
*James Robert Langworthy*
BY
*Polachek & Saulsbury*
ATTORNEYS

United States Patent Office 3,410,638
Patented Nov. 12, 1968

3,410,638
SPECTACLE FRAME WITH REAR VIEW TELESCOPES AND TEMPLE MOUNTED OPTICAL FIBER RODS
James Robert Langworthy, Box 5108,
Clinton, N.J. 08809
Filed Dec. 9, 1965, Ser. No. 512,659
2 Claims. (Cl. 351—50)

This invention concerns eyeglasses constructed so as to provide the wearer with a rear view.

Heretofore it has been known to provide a spectacle frame with a laterally extending mirror to provide a rear view. This construction has a number of objectionable features, a principal one being the conspicuous projection of the mirror or mirrors laterally of the frame. Another has been the difficulty of providing a rear view mirror which embodies the viewer's optical prescription. Other objections involve the fragile mounting of the mirrors, their frequent twisting out of proper viewing position, the difficulty of focusing them, the small field of view provided, etc.

The present invention is directed at overcoming the above and other difficulties and disadvantages and at providing an improved rear view construction for eyeglasses which embodies manifold advantages and conveniences. Basically the invention involves an optical assembly installed in a set of eyeglasses as an integral part thereof. The optical assembly includes a prism attached to or ground into the upper portion of a spectacle lens or frame, an image forming lens, an image transmission rod which also serves as a temple of the set of eyeglasses, and an adjustable image forming lens attached to the rear end of the image transmission rod. The image transmission rod is made of a multiplicity of glass fibers fused to form a solid rod and bent at one end to pass a light image into the image forming lens at the prism. The eyeglasses equipped with this optical assembly provides a viewer with an optically corrected view of the environment to his rear without in any way impairing his forward view through the spectacle lenses.

It is therefore a principal object of the invention to provide a pair of eyeglasses with an optical assembly providing a rear view, the assembly including an image conducting rod which also serves as a temple for the eyeglasses.

Another object is to provide an optical assembly for eyeglasses to provide a rear view, the assembly comprising a prism, image conducting rod and image forming lenses.

Still another object is to provide an optical assembly as last described with means for pivotally mounting the assembly on the frame of the eyeglasses, so that the eyeglasses can be folded, the image conducting rod being arranged to serve as a temple for the eyeglasses.

A further object is to provide an optical assembly as described which is inconspicuous when installed in a pair of eyeglasses so that it is not readily apparent from a position behind the wearer of the eyeglasses that the eyeglasses embody rear viewing means.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a top plan view of a pair of eyeglasses embodying the invention.

FIG. 2 is a rear view, partially in section of the eyeglasses, taken on line 2—2 of FIG. 1.

FIG. 3 is a top plan view of the eyeglasses in folded position.

FIG. 4 is an exploded perspective view of parts of a rear view optical assembly employed in eyeglasses of FIGS. 1–3.

FIG. 5 is an enlarged fragmentary sectional view taken on line 5—5 of FIG. 1.

FIG. 6 is an enlarged fragmentary sectional view taken on line 6—6 of FIG. 1.

FIG. 7 is an enlarged fragmentary sectional view taken on line 7—7 of FIG. 3.

Referring to the drawing, there is shown in FIGS. 1, 2 and 3, a pair of eyeglasses comprising a plastic frame 10. This frame has loops 12 in which are set forward view lenses 14 in conventional manner. The loops are connected by a nose bridge 16 with nose rest flanges 18 at inner edges of the frame loops. To the extent described the eyeglasses are conventional. Each of the loops has a cutaway upper outer corner 20. This upper edge 21 of this corner is slightly curved or grooved. In this groove is secured by cement 22 a cylindrical lens assembly 24; see FIGS. 6, 7. This assembly is a rigid unit including a cylindrically shaped end portion 25, a plurality of lenses 26 ground or molded to conform with the optical correction requirements of the wearer of the eyeglasses, and a 45° prism 28. The oblique end 29 of the prism serves as a light reflecting surface. The parts of the assembly are preferably made of suitable transparent plastic material.

The lens assembly 24 forms part of an optical assembly 30 which includes an image conducting rod 32 made of fused glass fibers; see FIG. 4. One end 34 of the rod is bent at a right angle so that this end is axially aligned with the cylindrical lens assembly 24 while the major portion 36 of rod 32 extends axially perpendicularly to end 34. The image conducting rod has the desirable characteristic of conducting a light image without distortion, magnification or reduction from end to end even though the rod may be bent at one or more points.

Around the rod portion 36 near end 34 is a thin ring or collar 38 having a hinge member 39 integral therewith as clearly shown in FIGS. 2, 4 and 6. This hinge member is engaged by rivet pin 40 with another interfitting hinge member 42 attached by rivets 44 to the frame just below edge 21 of the cutaway corner. This arrangement defines a temple for the eyeglasses. The frame has two such temples at opposite sides. The temples are pivotable from open position as shown in FIGS. 1, 2 to closed position shown in FIG. 3.

Each of the optical assemblies 30 includes a telescopic optical lens assembly 50. This assembly has a tubular sleeve 52 rigidly mounted on the outer free end of rod 32; see FIG. 5. In sleeve 52 is a lens 53 arranged to focus an image of a rear view upon the rear end 55 of rod 32. An objective lens 56 is mounted in a tube 58 slidably and adjustably disposed in the outer end of sleeve 52. Slidable adjustment of the tube 58 focuses a rear view image upon the end of rod 32. The rod 32 in turn conducts this image to optical assembly 24 where lenses 26 correct the image to the optical parameters required by the viewer's eye. Each optical assembly 24 will have lenses 26 adapted for the particular optical prescription of the right or left eye of the viewer.

A curved lateral projection 60 is attached to each sleeve 52 and serves as a temple rest member at the side of the wearer's head. The user is thus provided with a pair of eyeglasses which are comfortable to wear. When viewed from the rear they appear like ordinary eyeglasses and their rear viewing capability is not readily apparent.

FIG. 1 shows in dotted and dashed lines the optical path P of one of the optical assemblies 30. It will be noted that in the bend 34' of rod 32 the line of sight S is bent 90° and continues as line sight S' in lens assembly 24. In prism 28 at oblique surface 29 the line of sight S' is bent perpendicularly to form the line of sight S" which reaches the viewer's eye. The optical path P is thus doubly bent, so that line of sight S" is parallel to but opposite to line of sight S.

Each of the optical assemblies thus embodies telescopic lenses, visual defect correction lenses, an image conducting transmission rod, and a prism. The bend in the end of the rod and the right angle prism effect double bending of the optical path through the optical assembly.

Although the eyeglasses are shown fitted with two optical assemblies, it is possible in the interest of economy to provide two temples in which only one temple has optical assembly 30. The other temple will have no telescopic lenses nor visual correction lenses.

Instead of attaching the lens assembly to the frame 10 as illustrated, the lens assembly 24 can be built into the frame while the prism 28 is ground into the spectacle lens, or the entire lens assembly can be ground into the spectacle lens.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. An optical assembly to provide a rear view for a pair of eyeglasses having a frame and forward view spectacle lenses, said assembly comprising an elongated fused glass fiber rod which has a major section serving as a temple piece mounted perpendicularly to the spectacle lens frame, with a minor section being bent at an angle of 90° and extending along an upper cut-out portion of the lens frame, a telescopic lens assembly mounted on the rear end of the temple piece fiber rod section for focusing a rear view image on the rear end of said fiber rod, visual correction lenses mounted on the upper spectacle lens rim frame in axial alignment with the bent inner end of said fiber rod for receiving said rear view image, a prism having an end face disposed 45° to the axis of said corrective lenses for optically directing the rear view image to the eye of the eyeglass wearer, said line of sight from said prism being opposite in direction and parallel to the line of sight through said temple piece fiber rod, and mounting means for said fiber rod, comprising a ring around the rod near said bend end, and a hinge member secured to said ring and adapted to interfit with a hinge member carried by said spectacle frame such that the fiber rod is pivotable on the frame to fold against it.

2. An optical assembly as recited in claim 1, wherein the said telescopic lens assembly comprises a sleeve fitted on said rear end of the temple piece fiber rod, a lens in said sleeve for focusing a rear view image on said one end of the rod, a tube slidable and frictionally fitted in said sleeve, and an objective lens in said tube for focusing a rear view upon the lens in the sleeve, and a temple rest member extending laterally from the sleeve.

References Cited

UNITED STATES PATENTS 3,216,778  11/1965  Davies et al. _____ 350—96

FOREIGN PATENTS 401,027  8/1909  France.

DAVID SCHONBERG, *Primary Examiner.*

W. L. BROWN, *Assistant Examiner.*